United States Patent [19]

Shaffer et al.

[11] Patent Number: 5,570,532
[45] Date of Patent: Nov. 5, 1996

[54] FISH STRIKE SENSOR

[76] Inventors: Charles S. Shaffer, 2740 Barton Ave.;
Mark A. Priest, 1105 Minnesota St.,
both of Waterloo, Iowa 50702

[21] Appl. No.: 500,268

[22] Filed: Jul. 10, 1995

[51] Int. Cl.⁶ .................................................. A01K 97/12
[52] U.S. Cl. ................................................................ 43/17
[58] Field of Search ........................... 43/17, 17.5, 15, 43/16, 44.91

[56] References Cited

U.S. PATENT DOCUMENTS

| | | | |
|---|---|---|---|
| 2,530,050 | 11/1950 | Evans | 43/17 |
| 2,560,905 | 7/1951 | Teel | 43/17 |
| 2,869,275 | 1/1959 | Levin | 43/17 |
| 3,798,630 | 3/1974 | Crosthwait | 340/279 |
| 3,903,633 | 9/1975 | Hutcherson | 43/17 |
| 3,945,143 | 3/1976 | Schmitt, Sr. | 43/17 |
| 4,004,365 | 1/1977 | Manchester | 43/17 |
| 4,266,217 | 5/1981 | Kao et al. | 43/17 |
| 4,384,425 | 5/1983 | Lemons, Sr. | 43/17 |
| 4,420,900 | 12/1983 | Nestor | 43/17 |
| 4,458,437 | 7/1984 | Ou | 43/17 |
| 4,633,608 | 1/1987 | Savarino | 43/17 |
| 4,766,688 | 8/1988 | Hiles | 43/17 |
| 4,811,512 | 3/1989 | Amos | 43/17 |
| 4,908,973 | 3/1990 | Perks | 43/17 |
| 5,058,308 | 10/1991 | Girard | 43/17 |
| 5,185,949 | 2/1993 | Patterson | 43/17 |
| 5,396,726 | 3/1995 | Zepeda, Sr. | 43/17 |

*Primary Examiner*—J. Elpel
*Attorney, Agent, or Firm*—Zarley, McKee, Thomte, Voorhees, & Sease

[57] ABSTRACT

A fish strike sensor adapted to mount on various surfaces and includes a cradle for supporting a fishing rod and reel. The fish strike sensor includes a movable spring retainer that releasably retains a portion of the fishing line such that when a fish strikes the bait on a fishing line the removable retainer moves a certain distance with the fishing line at which point the line is released. When the removable retainer moves, a switch is actuated which activates a buzzer and LED.

21 Claims, 3 Drawing Sheets

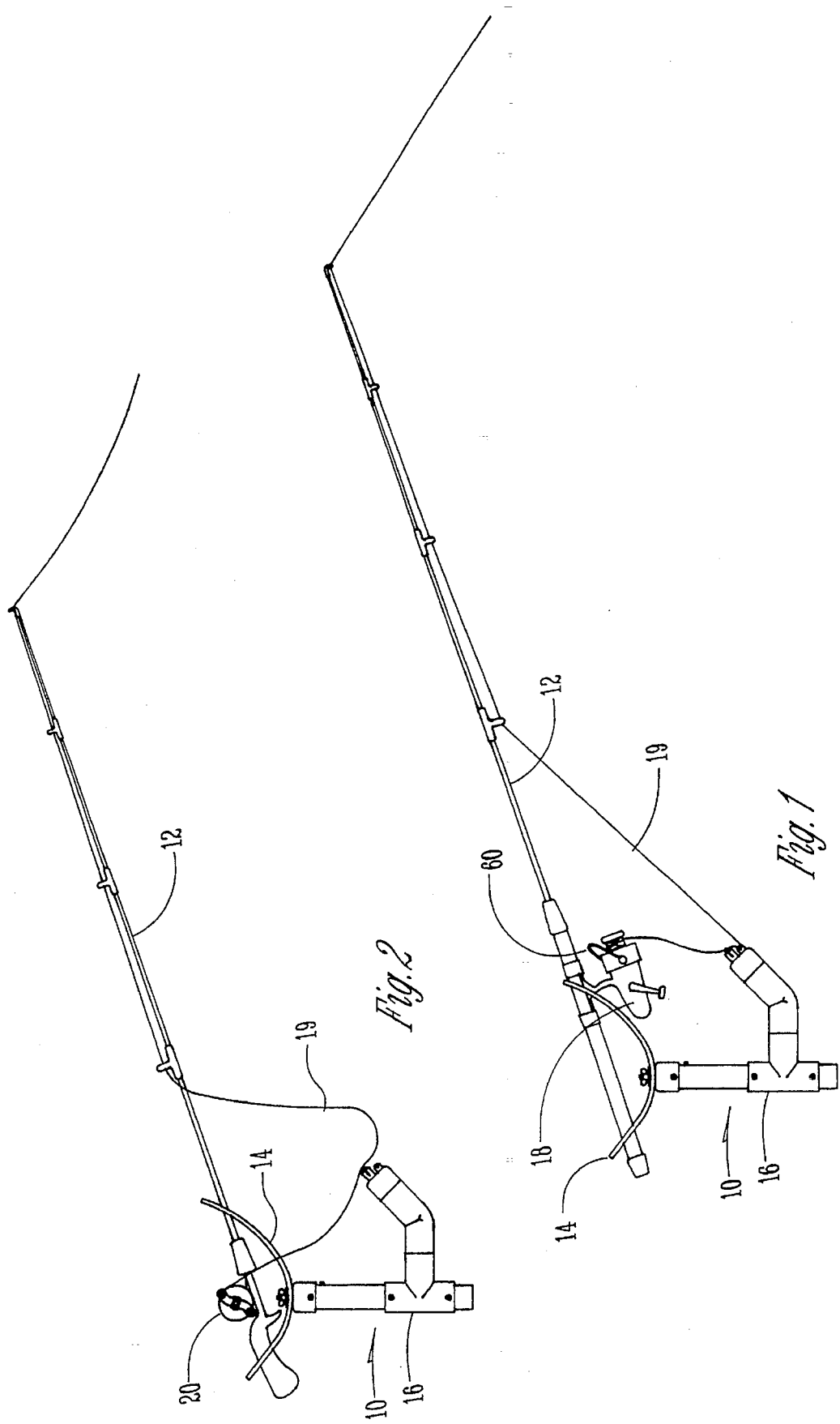

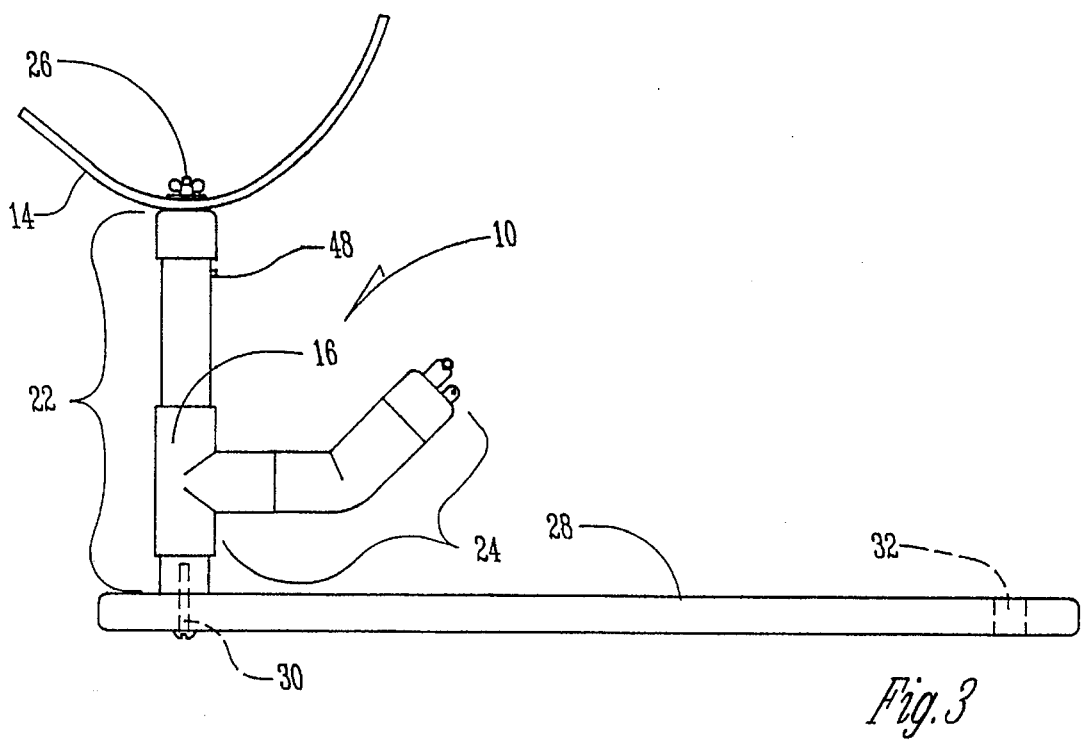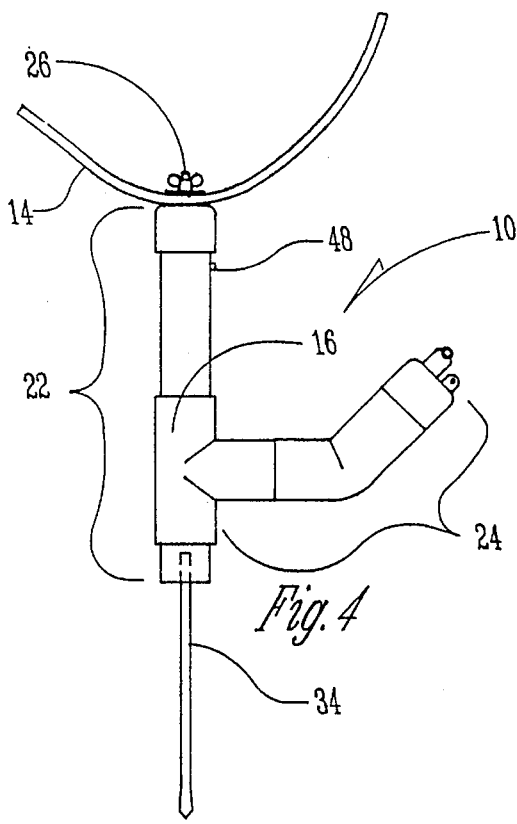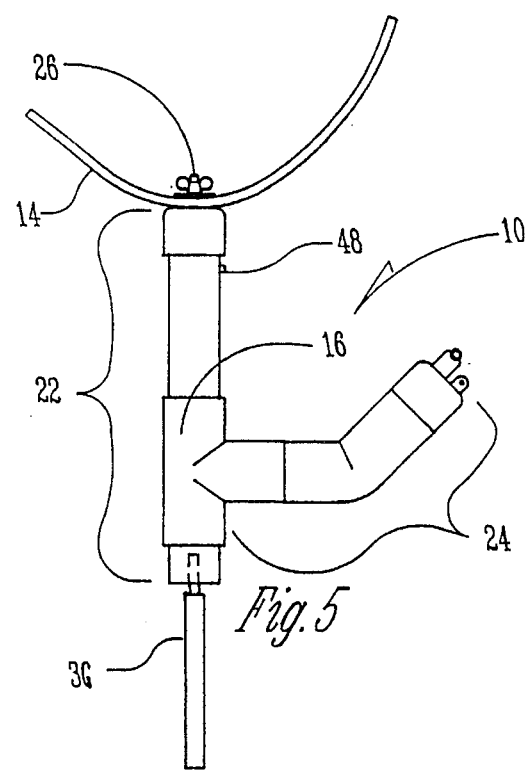

FISH STRIKE SENSOR

BACKGROUND OF THE INVENTION

FIELD OF THE INVENTION

The present invention relates to fishing tackle. More particularly, the present invention relates to an apparatus for sensing and indicating when a fish strikes the bait on a fishing line.

PROBLEMS IN THE ART

There are a number of devices in the prior art that provide an indication of a fish strike to a fisherman. Some prior art devices simply consist of a bell attached to the end of a fishing rod. When a fish bites, the tip of the rod moves making the bell ring. For another example, when ice fishing, it is known to use a flag which tips up when a fish bites a line. Other prior art devices sense whether an entire fishing rod has tilted in response to a fish strike. Other systems include a mercury switch attached to the rod which senses when the rod tips. Still other prior art systems include an electrical contact surrounding the tip of the rod and a second contact on the tip of the rod for sensing when a fish causes the tip of the rod to move. Some prior art devices rigidly attach to the fishing line so that the line can not be moved without tripping a sensor.

The devices of the prior art have various disadvantages. Most prior art devices involve excessive complexity and also result in a nuisance or hindrance when fighting or reeling in fish. The prior art devices usually are not very precise and as a result cannot distinguish between a nibble and a strike from a fish. Most prior art devices are also ineffective in high winds, heavy currents, and other environmental conditions. Most prior art devices also require that some modifications and/or additions be made to existing fishing tackle. Prior art devices can also result in the fishing rod being pulled into the water when a fish strikes if the fisherman does not hold onto the rod. Existing devices also can be difficult to set, make the rod awkward, and have a limited usage.

Since most prior art devices operate by responding to a change in the fishing line tension, a requirement for their use is that the bail on the fishing reel must be closed so that the line is not free to simply come off the reel as the fish bites the line. As a result, when using a prior art device, a fish cannot run with the bait.

FEATURES OF THE INVENTION

A general feature of the present invention is the provision of a fish strike sensor for sensing and indicating when a fish has struck the bait on a fishing line.

A further feature of the present invention is the provision of a fish strike sensor which allows the bail of the fishing reel to remain open so that a fish can run with the bait.

A further feature of the present invention is the provision of a fish strike sensor which activates an indicator perceivable by the user after sensing a fish strike.

A further feature of the present invention is the provision of a fish strike sensor that may include a releasable fishing line retainer which retains the fishing line enough that a fish strike will activate an actuator connected to the retainer but releases the string after the actuator is activated.

An optional feature of the present invention is the provision of a fish strike sensor that includes a cradle for holding a fishing rod in a desired position while the fish strike sensor is in use.

An optional feature of the present invention is the provision of a fish strike sensor that is adapted to be mounted to either of a movable base, a boat, or the ground.

An optional feature of the present invention is the provision of a fish strike sensor that includes a secondary releasable line retainer to make the invention function better during windy conditions, high current, or trolling.

These as well as other features of the present invention will become apparent from the following specification and claims.

SUMMARY OF THE INVENTION

The fish strike sensor of the present invention is used by a fisherman to provide an indication perceivable by the fisherman when a fish bites the bait on a fishing line. The invention is comprised of a housing which is adaptable to be supported on various surfaces. A cradle may optionally be attached to the housing for supporting a rod and reel in an operable position. The present invention also includes a fishing line grasping device for grasping a portion of the fishing line. When a fish strikes a fishing line, the tension on the fishing line causes the device to actuate a user perceivable indicator which provides the fisherman with an indication that a fish has struck the bait on the fishing line.

The present invention may optionally include a secondary line retainer rigidly attached to the housing of the fish strike sensor. When fishing in areas with high current or when trolling, the fishing line can be inserted into both the grasping device and the secondary line retainer so that the current or the water itself cannot trigger the fish strike sensor.

When using the present invention, the bail of a fishing reel can be left open such that when a fish strikes the fishing line, the fish can run with the bait without feeling any resistance from the fish strike sensor.

BRIEF DESCRIPTION OF THE DRAWINGS

FIG. 1 is a side elevational view of a fish strike sensor according to the present invention used with a spinning reel.

FIG. 2 is a side view of the fish strike sensor of FIG. 1 used with a bait casting reel.

FIG. 3 is an enlarged side view of the embodiment of FIG. 1 shown mounted to a flat base.

FIG. 4 is a side view of the embodiment of FIG. 1 shown mounted to a metal stake.

FIG. 5 is a side view of the embodiment of FIG. 1 shown mounted to a boat attachment.

DETAILED DESCRIPTION OF THE PREFERRED EMBODIMENT

Figure 6:
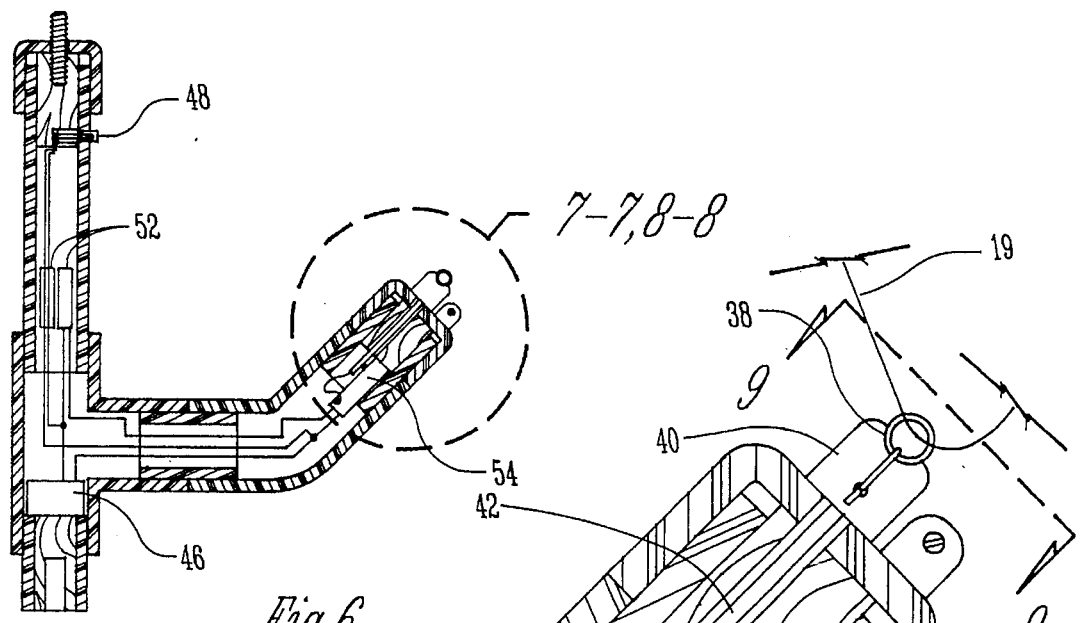
FIG. 6 is a sectional view of the embodiment of FIG. 1 showing the interior of the housing.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIG. 1 shows fish strike sensor 10 with fishing rod 12 supported by cradle 14 which is attached to housing 16 of fish strike sensor 10. It is to be understood that the term "housing" is not limited to what is shown in the Figures. Housing 16 can include any structure that supports components of fish strike sensor 10 whether it encloses them or not. Fishing rod 12 shown in FIG. 1 includes spinning reel 18 and fishing line 19. Similarly, FIG. 2 shows fishing rod 12 supported by cradle 14 with a bait casting reel 20. Fish strike sensor 10 can be used with any type of reel.

As shown in FIGS. 1–6, fish strike sensor 10 is comprised of housing 16 having a vertical portion 22 and a generally horizontal portion 24. Cradle 14 is a conventional rod supporting cradle and is adjustably attached to vertical portion 22 of housing 16 by wing-nut 26. By loosening wing-nut 26, cradle 14 can be slid back and forth which adjusts the angle of rod 12 which is supported by cradle 14. Any type of structure can be used to support fishing rod 12 or, alternatively, no rod supporting structure need be included at all.

Fish strike sensor 10 can be supported in a number of ways. For example, FIG. 3 shows housing 16 attached to a flat base 28 comprised of a piece of wood. Housing 16 is attached to base 28 with pin 30 which is inserted into both housing 16 and base 28. Base 28 includes handle 32 formed by cutting a hole through base 28. Base 28 can be used when fishing on a generally horizontal surface such as a dock. FIG. 4 shows fish strike sensor 10 with a metal stake 34 attached to housing 16. The configuration shown in FIG. 4 could be used when fishing along bank. Stake 34 is simply inserted into the ground to support fish strike sensor 10. FIG. 5 shows fish strike sensor 10 connected to a boat attachment 36 which is comprised of a wooden dowel which can be inserted through a corresponding hole in the boat.

The three mounting methods shown in FIGS. 3–5 can be used with the same fish strike sensor 10. The fisherman can use whichever support member he chooses depending on where he is fishing. Base 28 can be adapted to attach to both metal stake 34 and boat attachment 36 in order to stow them when they are not in use. These three supporting methods are shown for example only as many other supporting methods are possible within the scope of invention.

As shown in the Figures, spring retainer 38 is attached to plunger 40 having shaft 42 inserted through a hole in the end of horizontal portion 24 of housing 16. Plunger shaft 42 and its corresponding hole in housing 16 preferably have a round cross section, but could take on any shape. Near spring retainer 38 is an adjustable tension secondary line retainer 44. Secondary line retainer 44 is rigidly affixed to housing 16.

Figure 9:
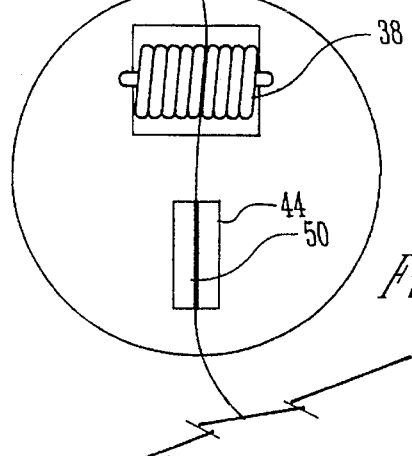
FIG. 9 is an enlarged end view taken along line 9—9 in FIG. 7 showing the spring retainer and the secondary line retainer according to a preferred embodiment of the present invention.

When using fish strike sensor 10, fishing rod 12 is inserted into cradle 14 after casting and fishing line 19 is attached to releasable spring retainer 38 (FIGS. 1, 2, 7 and 9). When a fish strikes the bait, the force on the line will pull plunger 40 part way out of housing 16 which activates an indicator which, for example, could be comprised of buzzer 46 and light 48 (FIG. 6). Any type of indicators can be used including, conventional buzzers, bells, lights, transducers, vibrating devices, etc. When fishing in high currents or when trolling, fishing line 19 can be inserted into slot 50 of secondary line retainer 44 in addition to spring retainer 38 (FIG. 9).

FIG. 6 is a sectional view of fish strike sensor 10 showing the various components of the sensor and the wiring. A pair of 1.5 volt batteries 52 are disposed in the housing and are connected in series with each other. Batteries 52 are connected in series to switch 54. Batteries 52 and switch 54 together are connected in parallel to buzzer 46 and LED 48 such that when switch 54 is closed, both buzzer 46 and LED 48 will activate.

Figure 7:
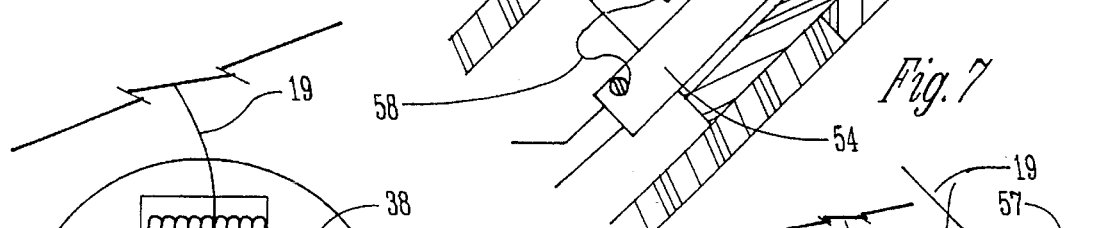
FIG. 7 is an enlarged partial view taken of the portion of FIG. 6 shown by line 7—7 showing the position of the plunger before a fish strike.
Figure 8:
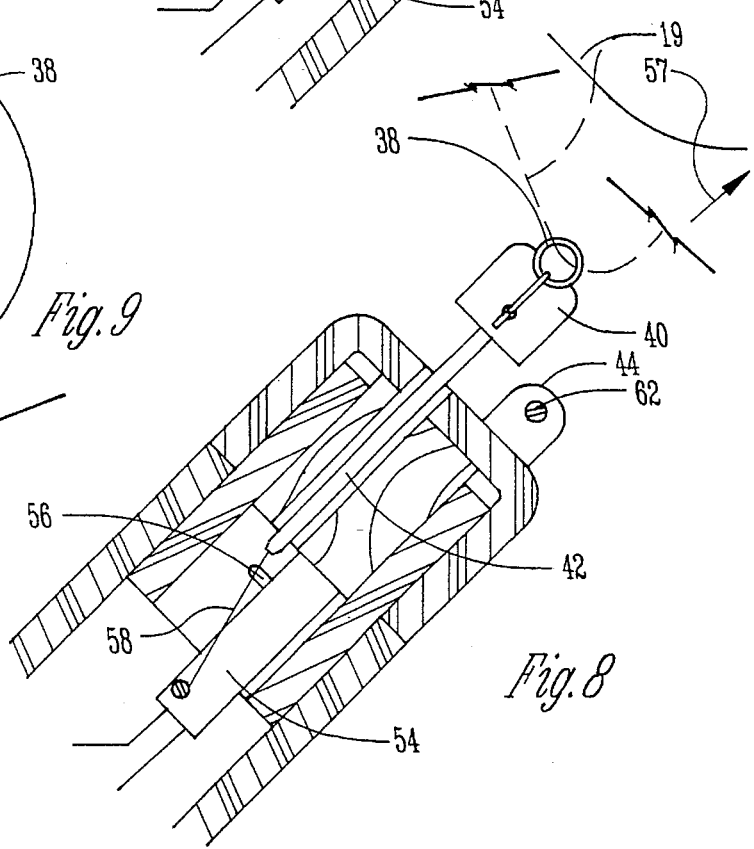
FIG. 8 is identical to FIG. 7 except showing the position of the plunger after a fish strike.

FIGS. 7 and 8 are close-up views showing how spring retainer 38, plunger 40 and switch 54 operate together. Switch 54 includes trigger member 56 which is normally biased away from switch 54 (FIG. 8) but is held down by plunger shaft 42 when plunger 40 is in the ready position (FIG. 7). In the ready position, switch 54 is open forming an open circuit. When a fish strikes the bait on fishing line 19, plunger 40 is pulled out to the position shown in FIG. 8. String 58 is attached to plunger shaft 42 and switch 54 to prevent plunger 40 from pulling all of the way out of housing 16. When string 58 stops plunger 40 from moving any further, the tension on fishing line 19 will pull it from spring retainer 38 (as shown by arrow 57 in FIG. 8). In place of string 58, a stop, or any other structure that will not fit through the hole in housing 16, could be formed near the end of shaft 42 to prevent plunger 40 from coming out of housing 16. FIG. 8 shows fishing line 19 before it is released (dashed line) and after it is released (solid line). When trigger member 56 is no longer held in by plunger shaft 42, switch 54 closes the electrical circuit which activates buzzer 46 and LED 48. Note that plunger 40 and switch 54 can take on many different configurations. Any type of switch could be used including micro switches, snap action switches, etc.

FIG. 9 is view looking straight down at the end of horizontal portion 24 of housing 16. FIG. 9 shows fishing line 19 inserted through spring retainer 38 and also through secondary line retainer 44.

The present invention operates as follows. When using fish strike sensor 10, housing 16 is supported as discussed above. For example, on flat or hard surfaces, flat base 28 can be used to support fish strike sensor 10. If fishing along a shore or bank, metal stake 34 can be pushed into the ground with fish strike sensor 10 attached to it. If fishing in a boat, boat attachment 36 can be used.

Cradle 14 is then adjusted to support fishing rod 12 at whatever angle desired. After casting fishing line 19, rod 12 is placed in cradle 14 and fishing line 19 is inserted into spring retainer 38 as shown in FIGS. 1, 2, 7 and 9. Rod 12, reel 18 and fish strike sensor 10 will remain in this position until a fish strikes the bait on fishing line 19. When a fish strikes the bait, the fish exerts a force on line 19 which pulls spring retainer 38 and plunger 40 outward from the ready position shown in FIG. 7 to the position shown in FIG. 8. When plunger shaft 42 moves far enough to clear trigger member 56, trigger member 56 moves to an outward position (FIG. 8) which closes the electrical circuit, and activates buzzer 46 and LED 48. Buzzer 46 and LED 48 alert the fisherman that a fish has struck the bait. As a result, the present invention can be used at night or by hearing or vision impaired fisherman.

When a fish strikes the line and pulls plunger 40 out, plunger 40 is only allowed to move a certain distance. A retainer string 58 is attached to plunger shaft 42 and switch 54 and restricts how far the plunger can move. When the plunger has moved its maximum distance, the line will slip out of retainer spring 38. If the fisherman has left the bail 60 of the spinning reel 18 open, the fish will be allowed to run with the fishing line 19 without sensing any resistance from fish strike sensor 10 and without pulling an unattended fishing rod into the water. To stop buzzer 46 and LED 48, the fisherman simply presses plunger 40 back to the ready position shown in FIG. 7. Fish strike sensor 10 is then ready to be used again.

When fishing in areas with a high current or when trolling, the force of the water on line 19 may be enough to pull plunger 40 outward to the position shown in FIG. 8. To fix this problem, the fisherman can use secondary line retainer 44. As shown in FIG. 9, the fishing line is simply inserted into slot 50 of secondary string retainer 44. This configuration is also shown in FIG. 1 for example. Secondary string retainer 44 has a tension that can be adjusted by turning a screw 62. When line 19 is inserted in spring retainer 38 and secondary line retainer 44, fish strike sensor 10 will be activated only when a force great enough to remove string from secondary string retainer 44 is exerted. In this way, the force of the water from the current or from trolling will not activate sensor 10. The indicators will only be activated when a fish strikes the bait.

The preferred embodiment of the present invention has been set forth in the drawings and specification, and although specific terms are employed, these are used in generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A fish strike sensor comprising:

a housing;

a user perceivable indicator connected to the housing;

an actuator to cause said indicator to operate;

a fishing line grasping device comprising a spring retainer having a plurality of coils for releasably grasping a fishing line, wherein the spring retainer releasably grasps the fishing line by placing a compression force on the fishing line when the fishing line is placed between two adjacent coils of the spring retainer;

a connection member connecting the grasping device to the actuator; and so that when a fish strikes the fishing line the grasping device moves with the fishing line to cause the indicator to operate while allowing the force from the fish strike to pull the fishing line from the grasping device after the grasping device causes the indicator to operate.

2. The fish strike sensor of claim 1 wherein the indicator is comprised of a buzzer.

3. The fish strike sensor of claim 1 wherein the indicator is comprised of a light.

4. The fish strike sensor of claim 1 further comprising a cradle coupled to the housing for supporting a fishing rod.

5. The fish strike sensor of claim 1 further comprising a base attachable to the housing for mounting the fish strike sensor to a relatively horizontal surface.

6. The fish strike sensor of claim 1 further comprising a stake attachable to the housing for supporting the housing by penetrating a ground surface.

7. The fish strike sensor of claim 1 further comprising a boat attachment coupled to the housing and attachable to a boat.

8. The fish strike sensor of claim 1 further comprising a secondary grasping device for releasably grasping the fishing line.

9. The fish strike sensor of claim 8 wherein the secondary grasping device is rigidly attached to the housing.

10. The fish strike sensor of claim 8 wherein the secondary grasping device has a grasping force that is adjustable by the user.

11. A fish strike sensor for use with a fishing rod for sensing when a fish strikes a fishing line comprising:

a housing;

a plunger coupled to the housing, said plunger being movable relative to the housing;

a line retainer coupled to the plunger for releasably retaining a portion of the fishing line such that the plunger and line retainer can move outward with the fishing line until the fishing line is released by the force of a fish strike;

a secondary retainer for releasably retaining the fishing line;

an actuator operatively coupled to the plunger such that the actuator is actuated when the plunger is moved outward by the fishing line when a fish strikes; and a user perceivable indicator electrically connected to the actuator such that the indicator is activated when the actuator is actuated.

12. The fish strike sensor of claim 11 wherein the indicator is comprised of at least one of a buzzer and a light emitting diode.

13. The fish strike sensor of claim 11 wherein the secondary retainer is rigidly attached to the housing.

14. The fish strike sensor of claim 11 wherein the secondary retainer has a tension adjustable by the user.

15. The fish strike sensor of claim 11 wherein said line retainer is comprised of a spring having a plurality of coils.

16. The fish strike sensor of claim 15 wherein said line retainer retains the line between two adjacent coils of the spring.

17. The fish strike sensor of claim 11 wherein the line retainer is rigidly mounted to the plunger.

18. A fish strike sensor comprising:

a housing;

a user perceivable indicator connected to the housing;

an actuator to cause said indicator to operate;

a fishing line grasping device for releasably grasping a fishing line;

a secondary grasping device for releasably grasping the fishing line;

a connection member connecting the grasping device to the actuator; and so that when a fish strikes the fishing line the grasping device moves with the fishing line to cause the indicator to operate while allowing the force from the fish strike to pull the fishing line from the grasping device after the grasping device causes the indicator to operate.

19. The strike sensor of claim 18 wherein the secondary grasping device has a grasping force that is adjustable by the user.

20. A fish strike sensor for use with a fishing rod for sensing when a fish strikes a fishing line comprising:

a housing;

a plunger coupled to the housing, said plunger being movable relative to the housing;

a line retainer rigidly mounted to the plunger for releasably retaining a portion of the fishing line such that the plunger and line retainer can move outward with the fishing line until the fishing line is released by the force of a fish strike;

an actuator operatively coupled to the plunger such that the actuator is actuated when the plunger is moved outward by the fishing line when a fish strikes; and a user perceivable indicator electrically connected to the actuator such that the indicator is activated when the actuator is actuated.

21. A fish strike sensor for use with a fishing rod for sensing when a fish strikes a fishing line comprising:

a housing;

a plunger coupled to the housing, said plunger being movable relative to the housing;

a line retainer coupled to the plunger for releasably retaining a portion of the fishing line such that the plunger and line retainer can move outward with the fishing line until the fishing line is released by the force of a fish strike, wherein the line retainer is comprised of a spring having a plurality of coils and wherein the line retainer retains the line between two adjacent coils of the spring;

an actuator operatively coupled to the plunger such that the actuator is actuated when the plunger is moved outward by the fishing line when a fish strikes; and a user perceivable indicator electrically connected to the actuator such that the indicator is activated when the actuator is actuated.

\* \* \* \* \*